Patented Feb. 28, 1928.

1,660,914

UNITED STATES PATENT OFFICE.

ARTHUR L. BROWN, OF EAST PITTSBURGH, PENNSYLVANIA, ASSIGNOR TO WESTINGHOUSE ELECTRIC & MANUFACTURING COMPANY, A CORPORATION OF PENNSYLVANIA.

PROCESS FOR THINNING VARNISH.

No Drawing.     Application filed October 4, 1924. Serial No. 741,761.

My invention relates to liquid coating compositions and specifically to a method of thinning enamel or varnish with solvents.

In the manufacture of varnish, the varnish resin is cooked with an oil, such as linseed oil, and with other ingredients, among which is a drier such as a manganese, cobalt or lead linoleate. When the varnish is sufficiently cooked or cured, a solvent or thinner, such as turpentine or a mineral solvent, is added while the fusion is still hot. Many of the solvents now available, especially the mineral oil solvents, contain sulphur or sulphur compounds. When such solvents are used for thinning the hot resin-oil mixture in the manner well known to the art, the metals of the drier material that are capable of forming insoluble sulphides, such as manganese or lead, are precipitated, thus forming an insoluble precipitate. The thinned varnish produced thereby is, consequently, clouded and is difficult to clear up. When, however, the varnish or enamel is partly thinned with a sulphur free solvent while hot, a solvent containing sulphur can be used for the remainder of the thinning when the mixture is cool.

I have discovered a method of thinning varnish whereby solvents containing sulphur and compounds of sulphur that are capable of reacting with metals to form insoluble sulphides may be used without involving the precipitation of the insoluble compounds of the metals.

A procedure which I have found successful is to add to the enamel about 1/4 to 1/5 by volume of solvent, such as turpentine, when the temperature of the varnish is about 175° C. The solvent added at this point must be free from sulphur or from compounds of sulphur which are able to react at the first thinning temperature with lead or manganese to form insoluble sulphides.

The partially thinned varnish is then covered to prevent oxidation from the air and is allowed to cool to room temperature. The thinning is then completed by adding the remainder of the solvent which may be a less refined product and may contain sulphur and sulphur compounds, such as turpentine substitute. The enamel or varnish thinned by this method is perfectly clear, has a brilliant appearance and does not contain any sulphide precipitate of the metals.

I have thus described a method of thinning varnish or enamel whereby a solvent which contains sulphur or sulphur compounds may be used in part for thinning the fused resin and oil mixture. The varnish is partly thinned while hot with a sulphur free solvent and, when cold, the thinning is completed by adding a less highly refined thinner that contains sulphur or sulphur compounds. By adding the thinner in the manner described, I am able to use an inexpensive and less highly refined solvent and to produce a clear first-class varnish.

While I have specifically described one modification of a process for thinning varnish, I do not wish to be limited thereto, as I may vary the method, as, for example, by making the first addition of thinner at another temperature than the one mentioned. The number of steps in the process or the amount of thinner added in each step of the process may also be varied without departing from the spirit of my invention, the scope of which is defined in the annexed claims.

I claim as my invention:

1. The method of thinning varnish compounds which comprises adding a sulphur-free solvent to the hot varnish and then a solvent containing sulphur when the mixture is cold.

2. The method of thinning hot varnish compounds which contains material precipitable by sulphur compounds, which comprises adding a sulphur free solvent, cooling and then adding a solvent containing sulphur.

3. The method of thinning varnish compounds which comprises cooling the fused varnish resin compound to about 175° C., and adding a sulphur free solvent, cooling and then adding a solvent containing sulphur.

4. The method of thinning varnish containing material precipitable by sulphur compounds which comprises cooling the fused varnish resin compound to 175° C., adding about 20% by volume of a sulphur-free solvent, cooling and then adding a solvent containing reactive sulphur compounds.

5. The method of thinning hot varnish compounds which comprises adding a thinner which contains no reactive sulphur compounds, cooling and then adding a thinner containing a reactive sulphur compound.

6. The method of thinning hot varnish compounds containing material precipitable by sulphur compounds which comprises adding a thinner which contains no sulphur compounds that are reactive toward said material and then cooling to a lower temperature and adding a thinner containing a reactive sulphur compound.

7. The method of thinning hot varnish compounds containing material precipitable by sulphur compounds which comprises cooling the fused varnish resin compound to 175° C., adding about 20% by volume of a thinner which contains no sulphur compounds that are reactive toward said material and then cooling to a lower temperature and adding a thinner containing a reactive sulphur compound.

In testimony whereof, I have hereunto subscribed my name this first day of October, 1924.

ARTHUR L. BROWN.